(12) United States Patent
Nagahara

(10) Patent No.: US 9,035,896 B2
(45) Date of Patent: May 19, 2015

(54) INFORMATION SHARING APPARATUS AND INFORMATION SHARING SYSTEM

(71) Applicant: Takanori Nagahara, Kanagawa (JP)

(72) Inventor: Takanori Nagahara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 84 days.

(21) Appl. No.: 13/856,532

(22) Filed: Apr. 4, 2013

(65) Prior Publication Data

US 2013/0271403 A1 Oct. 17, 2013

(30) Foreign Application Priority Data

Apr. 17, 2012 (JP) ................................ 2012-093764

(51) Int. Cl.
| | | |
|---|---|---|
| *G06F 3/041* | (2006.01) | |
| *G06F 3/14* | (2006.01) | |
| *H04L 12/18* | (2006.01) | |
| *H04L 29/06* | (2006.01) | |
| *G06F 3/048* | (2013.01) | |

(52) U.S. Cl.
CPC .......... *G06F 3/1454* (2013.01); *H04L 12/1813* (2013.01); *H04L 65/403* (2013.01); *H04L 67/38* (2013.01); *G06F 3/048* (2013.01); *H04L 65/80* (2013.01)

(58) Field of Classification Search
CPC ... G06F 3/048; G06F 3/1454; H04L 12/1813; H04L 65/80; H04L 65/403; H04L 67/38
USPC .................. 345/156–184, 420.629; 358/1.15; 348/14.07–14.12; 715/753
See application file for complete search history.

(56) References Cited

U.S. PATENT DOCUMENTS

| | | | | |
|---|---|---|---|---|
| 4,601,003 | A * | 7/1986 | Yoneyama et al. ............ | 715/775 |
| 6,369,805 | B1 * | 4/2002 | Kuzunuki et al. ............. | 345/173 |
| 6,598,978 | B2 * | 7/2003 | Hasegawa ....................... | 353/42 |
| 7,213,766 | B2 * | 5/2007 | Ryan et al. ..................... | 235/492 |
| 2001/0019325 | A1 * | 9/2001 | Takekawa ....................... | 345/157 |
| 2007/0058196 | A1 | 3/2007 | Nagahara et al. | |
| 2007/0087756 | A1 * | 4/2007 | Hoffberg ....................... | 455/450 |

(Continued)

FOREIGN PATENT DOCUMENTS

| | | |
|---|---|---|
| EP | 0319232 A2 | 6/1989 |
| JP | 2008-033393 | 2/2008 |
| JP | 2011-151613 | 8/2011 |

OTHER PUBLICATIONS

U.S. Appl. No. 13/677,934, filed Nov. 15, 2012.

(Continued)

*Primary Examiner* — Prabodh M Dharia
(74) *Attorney, Agent, or Firm* — Cooper & Dunham LLP

(57) ABSTRACT

A novel information sharing apparatus that comprises an information sharing system, connects multiple sites via a network shares each other's handwriting and screens, and eases handwriting sender's psychological burden. In the information sharing system, a handwriting sender generates stroke after a user inputs coordinates, display the stroke in unsteady state, and sends coordinate information to a handwriting receiver. The handwriting receiver generates stroke based on the coordinate information sent from the handwriting sender, displays the stroke, and returns response information for displaying succeeded to the handwriting sender. After receiving the response information from the handwriting receiver, the handwriting sender changes the displayed stroke from unsteady state to steady state.

7 Claims, 12 Drawing Sheets

(56) References Cited

U.S. PATENT DOCUMENTS

| | | | |
|---|---|---|---|
| 2007/0146325 A1* | 6/2007 | Poston et al. | 345/163 |
| 2007/0176893 A1 | 8/2007 | Sato | |
| 2007/0204047 A1* | 8/2007 | Parker et al. | 709/227 |
| 2007/0263082 A1* | 11/2007 | Tamaru et al. | 348/14.08 |
| 2008/0105748 A1* | 5/2008 | Lei | 235/462.42 |
| 2009/0103134 A1* | 4/2009 | Fukushima | 358/1.15 |
| 2010/0069008 A1 | 3/2010 | Oshima et al. | |
| 2011/0126129 A1* | 5/2011 | Nagahara et al. | 715/753 |
| 2011/0154192 A1* | 6/2011 | Yang et al. | 715/256 |
| 2011/0181688 A1* | 7/2011 | Miyamoto et al. | 348/36 |
| 2012/0002231 A1 | 1/2012 | Nagahara et al. | |
| 2012/0032976 A1* | 2/2012 | Nagahara et al. | 345/629 |
| 2012/0062591 A1* | 3/2012 | Omura et al. | 345/629 |
| 2012/0188579 A1 | 7/2012 | Nagahara et al. | |
| 2012/0206387 A1 | 8/2012 | Omura et al. | |
| 2012/0235934 A1 | 9/2012 | Kawasaki et al. | |
| 2013/0046722 A1* | 2/2013 | Hanson | 706/47 |
| 2013/0215116 A1* | 8/2013 | Siddique et al. | 345/420 |

OTHER PUBLICATIONS

U.S. Appl. No. 13/711,741, filed Dec. 12, 2012.
U.S. Appl. No. 13/693,371, filed Dec. 4, 2012.
European search report dated Jul. 11, 2013 in connection with corresponding European patent application No. 13 16 1504.9.

* cited by examiner

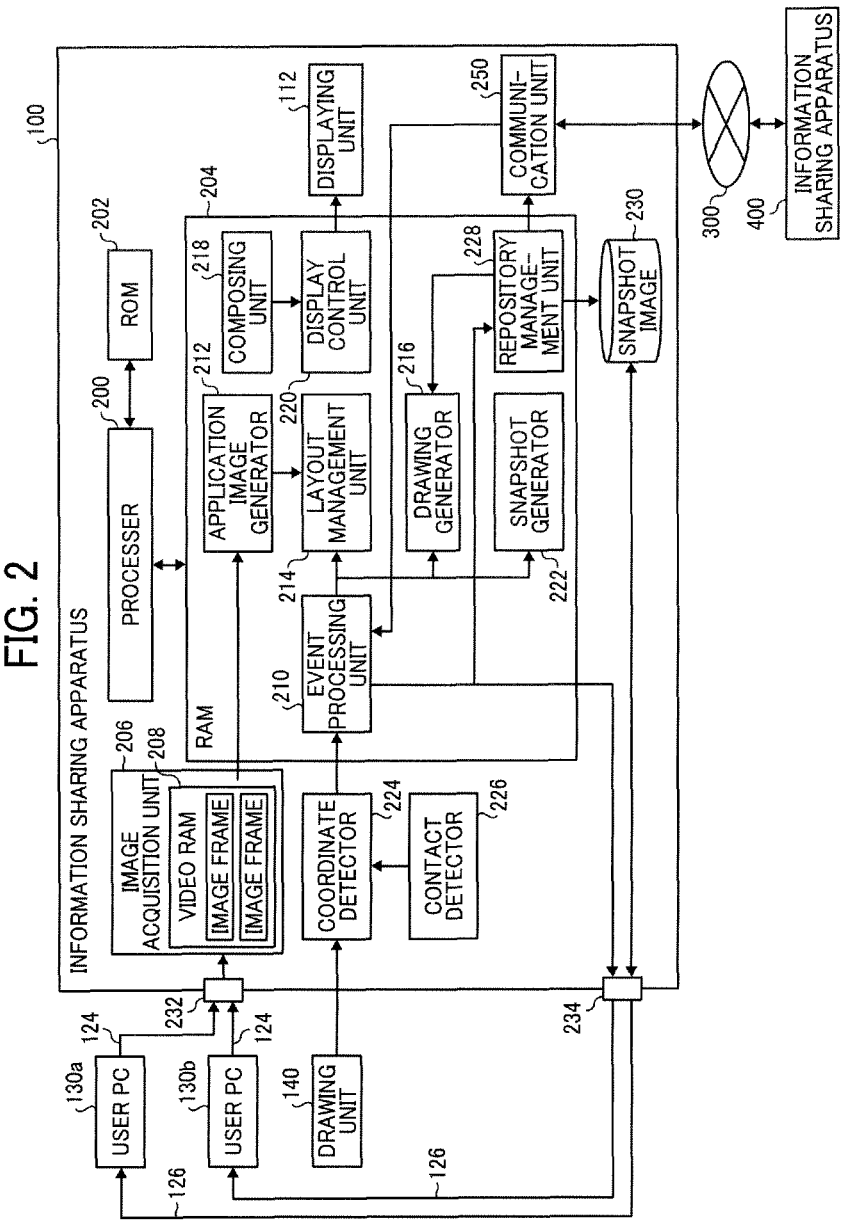

FIG. 3

| NAME | VALUE |
|---|---|
| To | DESTINATION ADDRESS |
| From | ORIGINATING ADDRESS |
| Via | SOURCE ADDRESS |
| Message-ID | ID IDENTIFYING MESSAGE UNIQUELY (RFC822 FORM; <DATE TIME+SEQUENCE NUMBER@IP ADDRESS>) <br> · GENERATED TIME: UTC (UNIVERSAL COORDINATED TIME) <br> · SEQUENCE NUMBER:NONNEGATIVE INTEGER INCREMENTING BY 1 FOR EACH GENERATED MESSAGE (0-4294967296) <br> · EXAMPLE: 20040401121234.1@192.168.21.133 (MESSAGE WHOSE SEQUENCE NUMBER IS 1 SENT FROM 192.168.21.133 ON APRIL 1, 2004 AT 12:12:34) |
| References | REFER TO Message-ID (USED IN ACK) |
| Method | ONE OF ADD, DEL, UPD, ACK, AND ERR |
| Content-Type | EITHER application/inkml+xml. OR application/octet-stream |
| Content-Length | SIZE OF BODY (NUMBER OF OCTETS) |
| Body | TEXT (XML) OR BINARY |

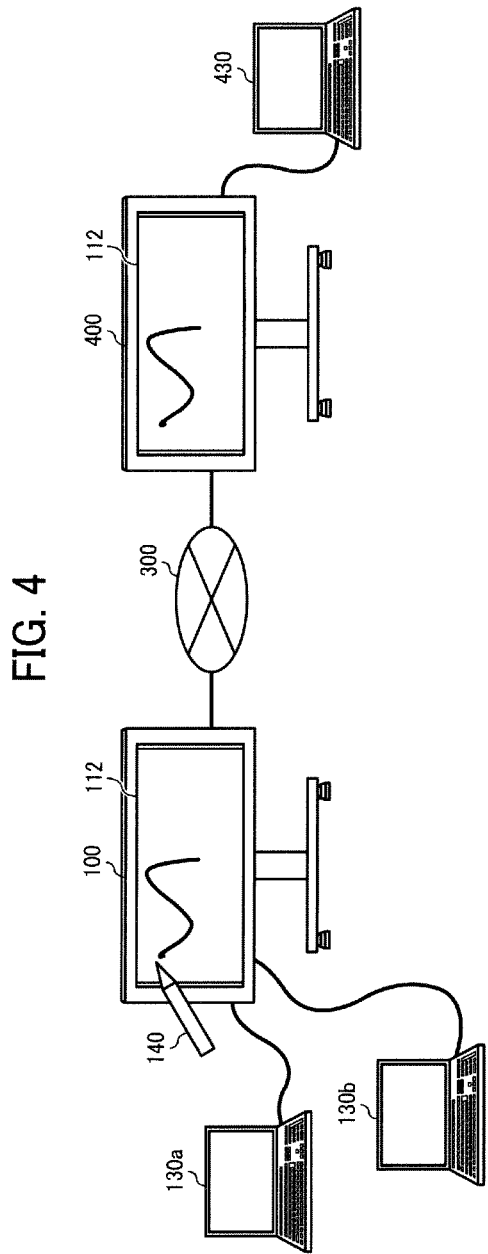

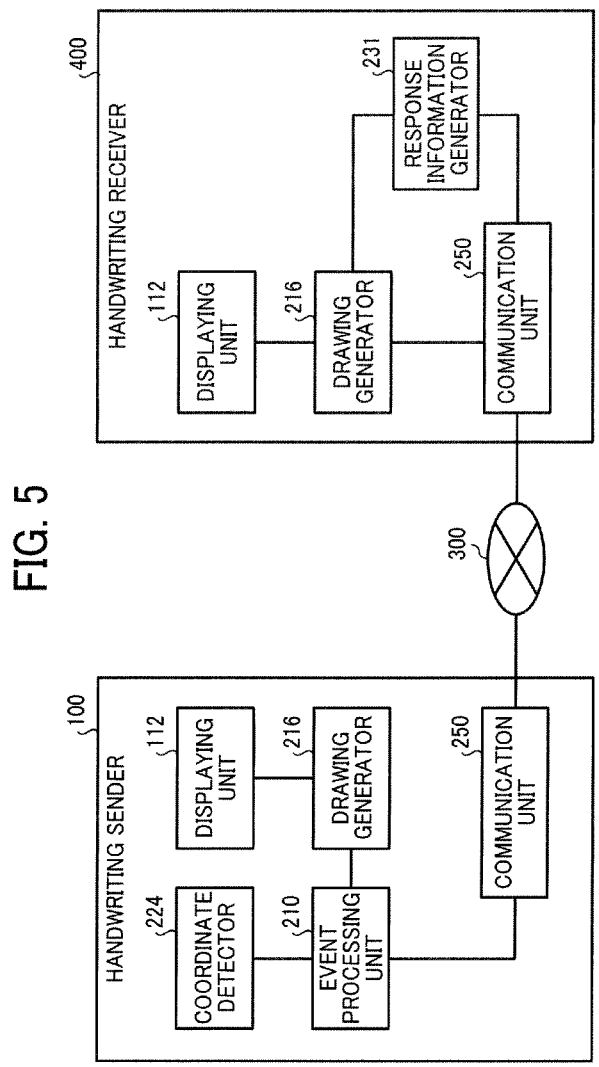

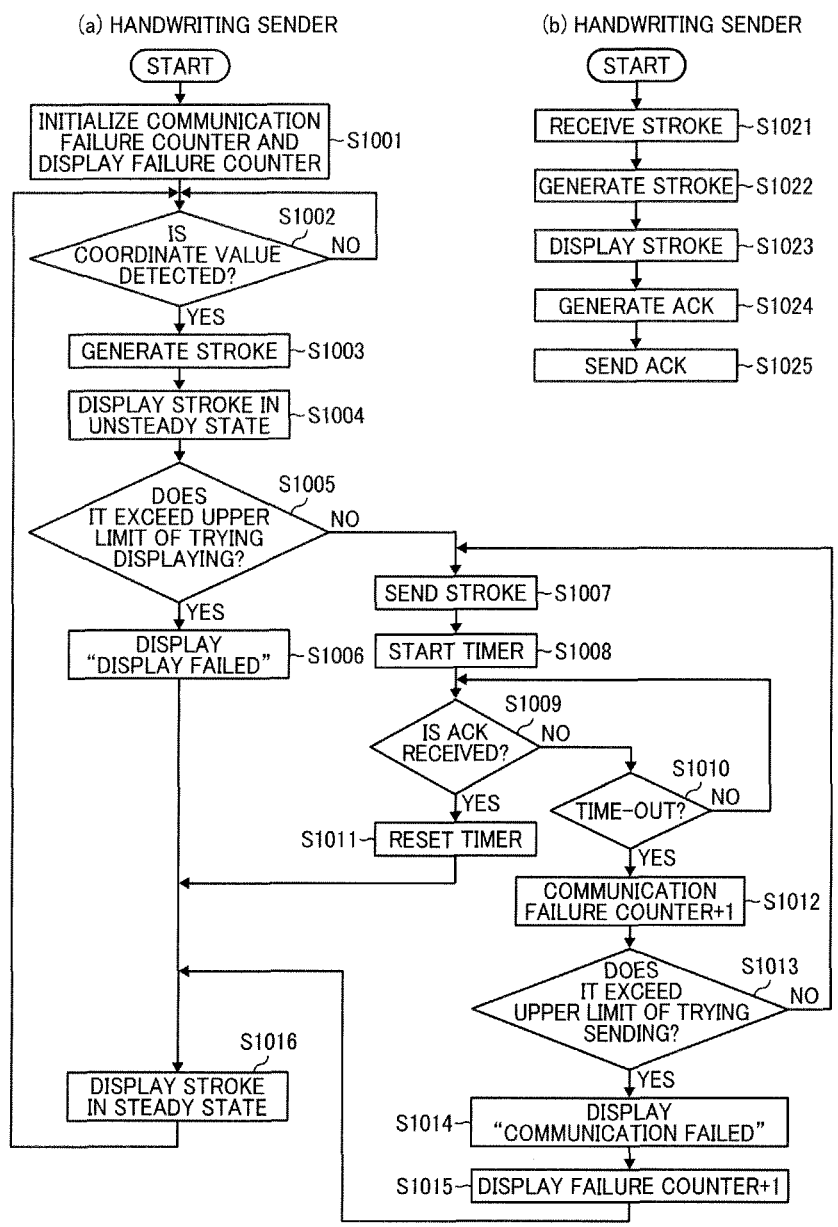

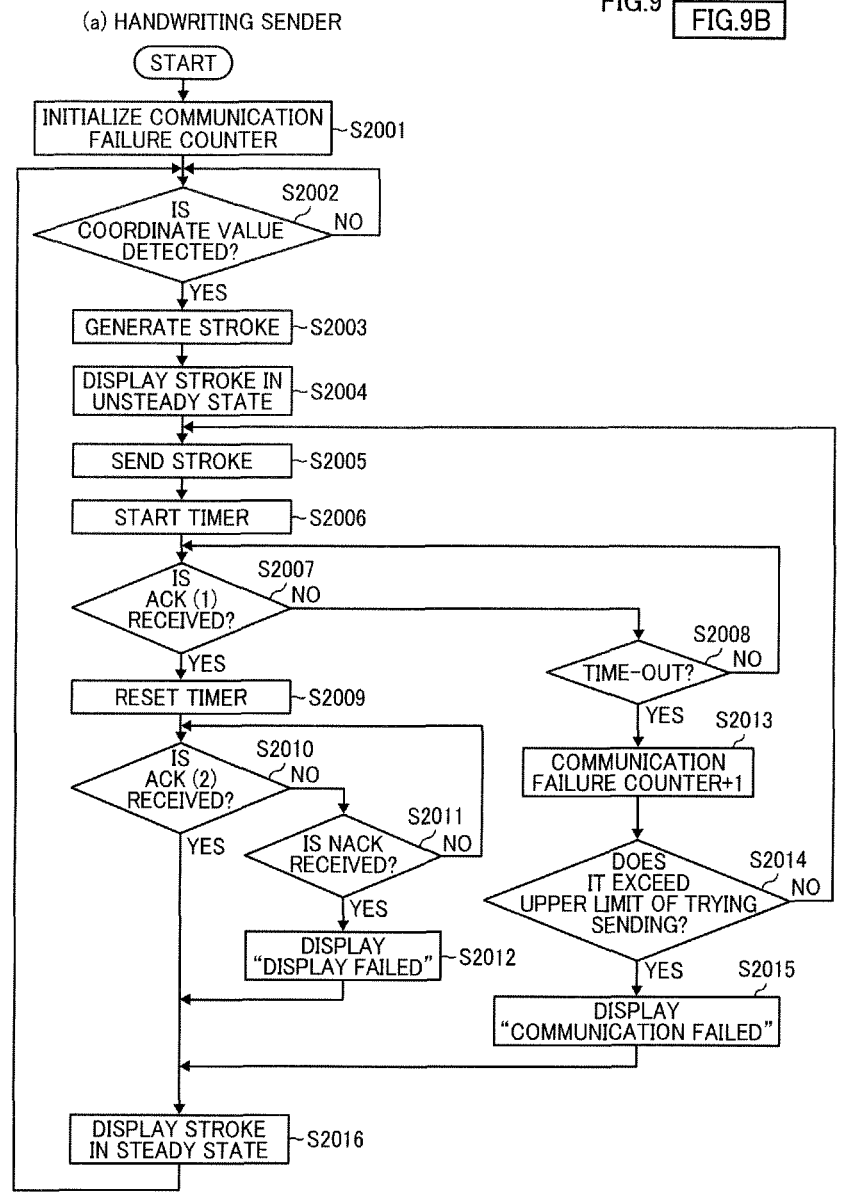

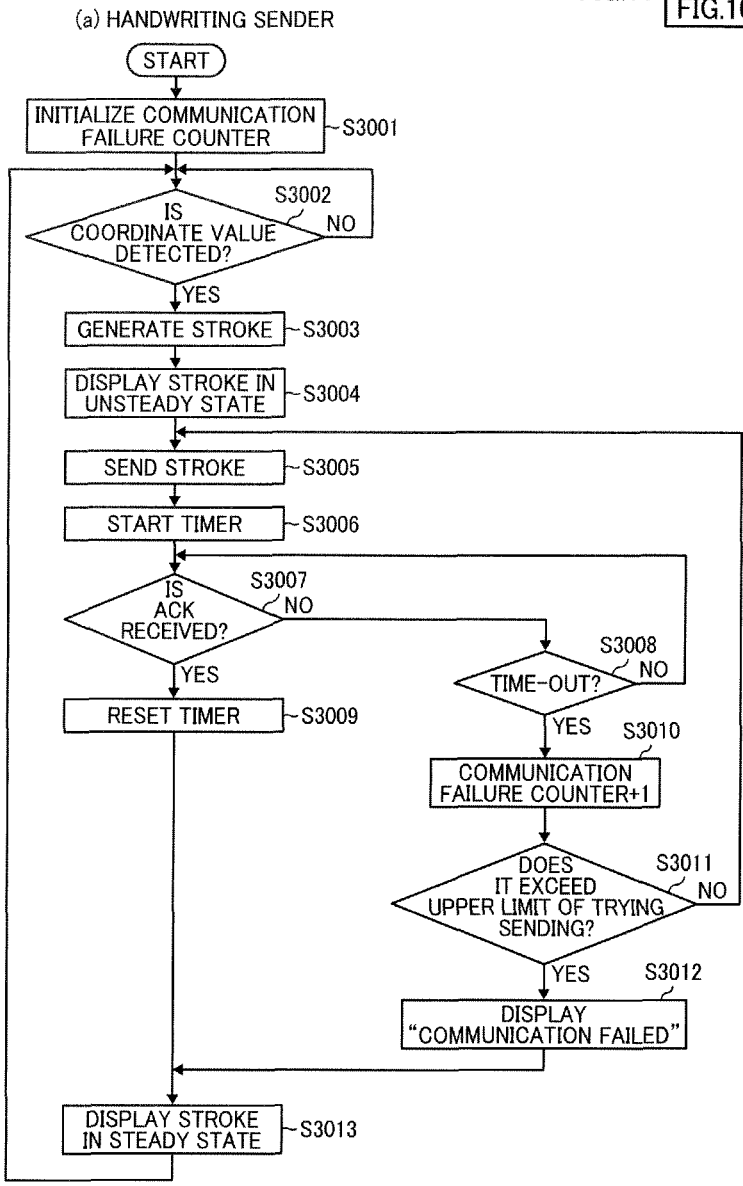

INFORMATION SHARING APPARATUS AND INFORMATION SHARING SYSTEM

CROSS-REFERENCE TO RELATED APPLICATION

This patent application is based on and claims priority pursuant to 35 U.S.C. §119 to Japanese Patent Application No. 2012-093764, filed on Apr. 17, 2012 in the Japan Patent Office, the entire disclosure of which is hereby incorporated by reference herein.

BACKGROUND

1. Technical Field

The present invention relates to an information sharing apparatus and an information sharing system that facilitate connecting with each other at multiple sites via a network and sharing handwriting and a screen with each other.

2. Background Art

Electronic information board apparatuses that include a large-sized flat panel display (approximately 40-60 inches) such as LCD and plasma display or use a projector equipped with a touch panel are now commercially available. These apparatuses can display a large-scale version of the screen of a connected PC and are widely used at presentations and meetings, etc., at companies, administrative agencies, educational institutions, and the like.

Usually, this kind of electronic information board apparatus operates the PC that displays the screen by touching the displayed screen using a touch panel function instead of operating a mouse, thereby facilitating operating the PC via the touch panel as a PC operating function via the touch panel. Furthermore, electronic whiteboard application software that runs on the connected PC is also provided along with these apparatuses. The electronic information board apparatus provides a screen that acts as a whiteboard in combination with the application software, and functions such as writing by hand on the screen via the touch panel and superimposing handwriting on the screen of the PC that runs the application are provided as a handwriting function via the touch panel.

Alternatively, an information sharing apparatus that facilitates teleconferences connecting these electronic information board apparatuses at multiple sites via a network such as internet and intranet, talking over the phone, and sharing each other's handwriting and screens is provided. With this kind of information sharing apparatus, participants in the teleconference can share lots of information with each other, which contributes to wrapping up the conclusion effectively by reviewing the content of the shared screens and reusing them at the end of the teleconference.

However, in this kind of information sharing apparatus that includes the teleconferencing function, there is delay of at least a network transmission time $\Delta t$ between displaying handwriting at the handwriting sender and at the handwriting receiver. Therefore, if the handwriting sender starts displaying at $t_0$, the handwriting receiver starts displaying at $t_0+\Delta t$, so there is a problem that the handwriting sender cannot know when the handwriting receiver starts displaying. Especially since the handwriting sender cannot see the receiver's reaction such as a nod over the telephone, the handwriting sender feels anxious about displaying the handwriting at the handwriting receiver's side, and that prevents participants from participating in the teleconference interactively.

For example, a technology of flashing handwriting at the receiver's side in order to promote interactive usage of handwriting at teleconferences has been proposed (e.g., JP-H06-284240-A.) Also, a technology of displaying symbols that indicate to the handwriting receiver that the handwriting sender is writing something by hand has been proposed (e.g., JP-2011-151613-A.) However, these technologies cannot solve the problem that the handwriting sender cannot know whether or not the handwriting is displayed at the handwriting receiver's side.

SUMMARY

The present invention provides a novel information sharing apparatus that connects multiple sites via a network shares each other's handwriting and screens, and eases handwriting sender's psychological burden.

More specifically, the present invention provides an information sharing apparatus that includes a coordinate detector that accepts inputting coordinates and detects coordinate information, a drawing generator that generates a drawing image in accordance with the coordinate information detected by the coordinate detector, a displaying unit that displays the drawing image generated by the drawing generator, a communication unit that sends the coordinate information to another information sharing apparatus and receives response information that indicates success in displaying from the other information sharing apparatus, and a control unit that has the displaying unit display the drawing image generated by the drawing generator in unsteady state and changes the displaying state from unsteady state to steady state in accordance with the response information from the other information sharing apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 2 is a diagram illustrating a hardware configuration and a functional configuration of the information sharing apparatus.

FIG. 3 is a diagram illustrating an example of communications data format.

FIG. 4 is a diagram illustrating an information sharing system.

FIG. 5 is a diagram illustrating a configuration of a first embodiment of the present invention.

FIG. 6 is a flowchart illustrating a process as the first embodiment.

FIGS. 9A and 9B are flowcharts illustrating a process executed by the configuration shown in FIG. 8.

FIGS. 10A and 10B are flowcharts illustrating a process as a third embodiment of the present invention.

DETAILED DESCRIPTION

Figure 1:
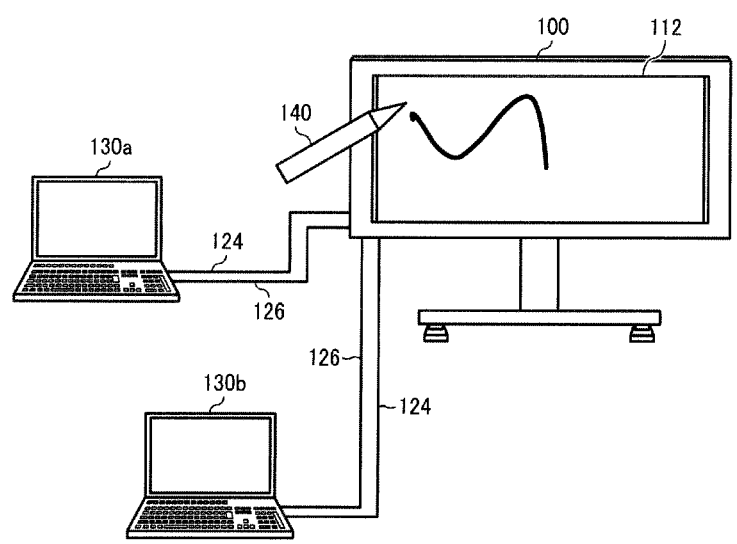
FIG. 1 is a diagram illustrating a configuration of an information sharing apparatus as an embodiment

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

FIG. 1 is a diagram illustrating a configuration of an information sharing apparatus. In FIG. 1, the information sharing apparatus 100 is connected to PCs 130a and 130b via a cable 124 and a cable 126. Also, the information sharing apparatus 100 is connected to another information sharing apparatus via a network such as internet and intranet (not shown in FIG. 1).

The information sharing apparatus 100 can display images from the PCs 130a and 130b and drawing images generated by touching a drawing device 140 with a touch panel displaying unit 112. Also, the information sharing apparatus 100 can send the drawing images to another information sharing apparatus via the network. Furthermore, the information sharing apparatus 100 generates an event by touching the displaying unit 112 and sends this event as an input event from input devices such as a mouse and a keyboard to the PCs 130a and 130b.

The PCs 130a and 130b are information processing apparatuses that provide images to be displayed. The PCs 130a and 130b include an interface to output an image signal that provides the information sharing apparatus 100 with an image signal that forms the display image of the PCs 130a and 130b at a predefined rate (e.g., 30 fps).

The PCs 130a and 130b include a Video Graphic Array (VGA) output connector (not shown in figures) as an interface and can send a VGA signal to the information sharing apparatus 100 via the cable 124 such as a VGA cable in this embodiment. In another embodiment, the PCs 130a and 130b can also send a display signal using wireless communications compliant with various wireless communications protocols.

Also, the PCs 130a and 130b can acquire images on the displaying unit 112 displayed by the information sharing apparatus 100. The PCs 130a and 130b include a USB port (not shown in figures) and acquire display images stored in the information sharing apparatus 100 connected via the USB cable 126 using general-purpose drives such as USB Mass Storage Class.

Although laptop PCs are used as the PCs 130a and 130b in FIG. 1, information processing apparatuses such as a desktop PC, a tablet PC, a PDA, a digital video camera, and a digital camera that can provide image frames can be used in other embodiments. Also, although two PCs 130a and 130b are adopted in FIG. 1, 1 PC or more than 3 PCs can be adopted in other embodiments.

FIG. 2 is a diagram illustrating a hardware configuration and a functional configuration of the information sharing apparatus. The information sharing apparatus 100 includes an image input interface 232 and an image output interface 234 and is connected to the PC 130a and 130b via those interfaces. Also, the information sharing apparatus 100 is connected to another information sharing apparatus 400 via a network 300 such as internet and intranet.

The image input interface 232 receives an image signal that forms a display image of the PCs 130a and 130b. A Digital Visual Interface (DVI) connector can be adopted as the image input interface 232 in this embodiment. The image input interface 232 receives a VGA signal via the cable 124 such as a VGA cable from the PCs 130a and 130b and provides an image acquisition unit 206 included in the image sharing apparatus 100 with the VGA signal. Also, a VGA connector, a High-Definition Multimedia Interface (HDMI) connector, and a Displayport connector can be adopted in other embodiments. Furthermore, the image input interface 232 can receive an image signal from the PC 130a and 130b using wireless communication compliant with wireless communication protocols such as Bluetooth and WiFi in other embodiments. The image output interface 234 outputs display images of the information sharing apparatus 100 to external devices such as the PCs 130a and 130b. A USB socket can be adopted as the image output interface 234.

The information sharing apparatus 100 includes a processor 200 as a control unit, a ROM 202, a RAM 204, an image acquisition unit 206, a coordinate detector 224, a touch detector 226, a displaying unit 112, and a communication unit 250 etc. It should be noted that the coordinate detector 224 and the touch detector 226 are integrated into the displaying unit 112 in practice.

The processor 200 is an arithmetic processing unit such as a CPU or a MPU, runs necessary OS, and executes programs written in necessary programming language under the management of the OS. The ROM 202 is a non-volatile memory that stores programs such as BIOS.

The RAM 204 is a storage device such as a DRAM and a SRAM and provides memory area for the processor 200 to execute programs, memory area to store data in the calculating process from the processor 200, and memory area to store data necessary for the processor 200 to execute processing.

The processor 200 reads programs from a hard disk drive (not shown in figures) that stores software programs and various data and executes it after loading it into the RAM 204. Programs loaded into the RAM 204 and executed include program modules, an event processing unit 210, an application image generator 212, a layout management unit 214, a drawing generator 216, a composing unit 218, a display control unit 220, a snapshot generator 222, and a repository management unit 228. In other words, the processor 200 implements these functions by executing programs loaded in the RAM 204.

The image acquisition unit 206 acquires an image signal from the PCs 130a and 130b. After receiving an image signal from the PCs 130a and 130b via the image input interface 232, the image acquisition unit 206 derives image information such as frame resolution and frame frequency of an image frame as display images of the PCs 130a and 130b formed by the image signal by analyzing the image signal and sends the image information to the application image generator 212. Also, the image acquisition unit 206 forms an image frame as display images of the PCs 130a and 130b using the image signal and overwrites the image frame to the video RAM 208 that can store image data temporarily. Although the image acquisition unit 206 includes the video RAM 208 in this embodiment, the video RAM 208 can be set up separately, and the RAM 204 can be used as the video RAM 208 in other embodiments.

The application image generator 212 generates various display windows to be displayed on the displaying unit 112. The display windows include a display window that displays an image frame as display images of the PCs 130a and 130b, a display window that displays a generated drawing image, a display window that displays buttons and menus to configure various settings of the information sharing apparatus 100, and display windows of a file viewer and a Web browser etc. The application image generator 212 draws these display windows on the appropriate image layer.

The layout management unit 214 draws a display image of the PCs 130a and 130b in display window generated by the application image generator 212. In cooperation with the application image generator 212, the layout management unit 214 acquires the image frame stored in the video RAM 208 from the image acquisition unit 206, adjusts the size of the image frame to fit in the display window generated by the application image generator 212, and draws the image frame on the appropriate image layer.

The touch detector 226 detects that an object such as the drawing device 140 touches. A coordinates inputting/detecting apparatus that uses infrared blockage is adopted as the touch detector 226 in this embodiment. In this coordinates inputting/detecting apparatus, two emitting/receiving units placed at both ends of the lower part of the displaying unit 112 emit a plurality of infrared light rays parallel to the displaying unit 112 and receives light reflected on the same optical path by reflecting components placed at the surroundings of the displaying unit 112. The touch detector 226 notifies the coordinate detector 224 of identifying information of infrared emitted by the two emitting/receiving units and reflected by the object, and the coordinate detector 224 specifies the coordinate position where the object touches.

In other embodiments, a touch panel that specifies touched location by measuring changes in electric capacitance, a touch panel that specifies touched location by measuring changes in voltage of two pairs of opposing resistive films, and a touch panel that specifies touched location by measuring electromagnetic induction generated when the object touches the displaying unit can be adopted as the touch detector 226.

The coordinate detector 224 calculates coordinate position where the object touches the displaying unit 112 and issues various events. In this embodiment, the coordinate detector 224 calculates coordinate position where the object touches using identifying information of the blocked infrared issued by the touch detector 226. The coordinate detector 224 issues various events to the event processing unit 210 along with the coordinate position where the object touches.

The events that the coordinate detector 224 issues include an event that notifies that an object touches or approaches (TOUCH), an event that notifies that the contact point moved after the object touched or the approach point moved after the object approached (MOVE), and an event that notifies the object departs from the displaying unit 112 (RELEASE). These events include coordinates position information as coordinates of the contact position or the approach position.

The drawing device 140 is a device for drawing by touching on the displaying unit 112 in the information sharing apparatus 100. The drawing device 140 is formed of a pen including a detector that detects approach of an object at its apical end. If the detector touches an object, a touch signal that notifies of touching is sent to the coordinate detector 224 along with the identifying information of the drawing device.

Also, the drawing device 140 includes a mode selecting switch that selects information sharing apparatus operating mode or PC operating mode on its side or back, etc. In the information sharing apparatus operating mode, a user can draw any shape or character, etc., on the displaying unit 112 in the information sharing apparatus 100 and select menus or objects such as buttons displayed on the displaying unit 112. In the PC operating mode, a user can select menus or objects such as buttons displayed on the displaying unit 112.

For example, if a user touches the drawing device 140 to the information sharing apparatus 100 after holding down the mode selecting switch, the drawing device 140 sends a mode type signal that indicates the PC operating mode along with a touch signal and its identifying information. If a user touches the drawing device 140 to the information sharing apparatus 100 without holding down the mode selecting switch, the drawing device 140 sends a mode type signal that indicates the information sharing apparatus operating mode along with a touch signal and its identifying information.

The coordinate detector 224 calculates coordinate position where the object touches after receiving identifying information of infrared from the touch detector 226 and issues various events after receiving a touch signal from the drawing device 140. Concurrently, the coordinate detector 224 notifies the event processing unit 210 of information that indicates mode type (referred to as "mode type information" hereinafter) along with the issued event.

Various signals are sent using short-range wireless communication such as Bluetooth in one embodiment. Various signals can be sent using wireless communication that uses ultrasonic wave or infrared in other embodiments.

The event processing unit 210 processes events that the coordinate detector 224 issues. The event processing unit 210 acquires coordinates of a starting point S after receiving a pen-down event (TOUCH) from the coordinate detector 224. Subsequently, the event processing unit 210 keeps acquiring intermediate coordinates $I_0$ and $I_1$ etc. at predefined rate (e.g. 100 Hz) until it receives a pen-up event (RELEASE). After receiving the pen-up event (RELEASE), the event processing unit 210 acquires coordinates of an ending point E and stores the acquired sequence of coordinates (S, $I_0$, $I_1$, ..., E) in the repository management unit 228 as stroke data. This stroke data includes acquired time (time in UTC), for each coordinates, writing pressure (in Newtons), and tilt of the pen (in degrees).

The event processing unit 210 sends a mouse event to the PCs 130a or 130b. Also, if the information sharing apparatus operating mode is specified, event processing unit 210 notifies other functional units in the information sharing apparatus 100 of a drawing command event and a selection notifying event after receiving the pen-up event (RELEASE) after receiving the pen-down event (TOUCH).

The mouse event is the same type of event issued by the input device such as mouse of the PCs 130a and 130b and issued to the PCs 130a and 130b in response to touch of the drawing device 140 in case the PC operation mode is specified. The event processing unit 210 converts coordinate position information included in the event issued by the coordinate detector 224 into coordinate position information in accordance with the size of screen of the PCs 130a and 130b and sends it to the PCs 130a and 130b along with the mouse event. The PCs 130a and 130b process the mouse event in the same manner as events issued by input devices such as a mouse.

The drawing command event commands the information sharing apparatus 100 to draw. The drawing command event is issued in response that the drawing device 140 touches the displaying unit 112 if the information sharing apparatus operating mode is specified.

The selection notifying event indicates that various objects such as buttons and menu bar that comprising the screen displayed on the displaying unit 112 were selected. The selection notifying event is issued in response to the drawing device 140 touching the displaying unit 112 if the information sharing apparatus operating mode is specified. The event processing unit 210 issues the selection notifying event if the coordinate position information included in the event that the coordinate detector 224 detects is within the coordinate area of the object.

Identifying information is allocated for the drawing command event and the selection notifying event in this embodiment, and the functional unit that starts operating after receiving those events as a trigger in the information sharing apparatus 100 executes various processes with reference to the identifying information. Also, identifying information of the selected object is included in the selection notifying event, and the functional unit that starts operating after receiving the selection notifying event as a trigger in the information sharing apparatus 100 executes various processes with reference to the identifying information of the object.

The drawing generator 216 generates a drawing image drawn with the drawing device 140. The drawing generator 216 generates an image layer on which the color of the coordinate position indicated by the coordinate position information is changed to a specific color in accordance with the drawing event from the repository management unit 228. The drawing generator 216 stores the coordinate position as drawing information in a storage area for drawing information in the RAM 204.

The composing unit 218 composes various images. The composing unit 218 composes an image layer on which the application image generator 212 draws an image (referred to as "application image layer" hereinafter), an image layer on which the layout management unit 214 draws an image displayed by the PCs 130a and 130b (referred to as "image capture layer" hereinafter), and an image layer on which the drawing generator 216 draws an image (referred to as "handwriting layer" hereinafter).

The display control unit 220 controls the displaying unit 112. The display control unit 220 displays the composite image generated by the composing unit 218 on the displaying unit 112. The composing unit 218 displays the composite image on the displaying unit 112 by calling the display control unit 220 in this embodiment. In another embodiment, the composing unit 218 and the display control unit 220 can composite image layers and display them on the displaying unit 112 at the same rate as the refresh rate of image frames included in the image information.

The snapshot generator 222 generates a snapshot image composing a display image of the PCs 130a and 130b and a drawing image that the drawing generator 216 generates. After receiving the selection notifying event that indicates a snapshot button that commands to acquire a snapshot displayed on the displaying unit 112 is selected, the snapshot generator 222 combines the image capture layer and the handwriting layer and generates a snapshot image. After generating the snapshot image, the snapshot generator 222 has the repository management unit 228 store the snapshot image in the storage device 230. An example of the storage device is a hard disk drive (HDD).

The repository management unit 228 controls the storage device 230 where the snapshot image is stored. As described above, the repository management unit 228 stores the snapshot image in the storage device 230 in response to the command from the snapshot generator 222. Also, the repository management unit 228 acquires the snapshot image from the storage device 230 and sends it to the PCs 130a and 130b in response to the command from the PCs 130a and 130b. Also, the repository management unit 228 acquires stroke data from the event processing unit 216 and sends it to the other information sharing apparatus 400 connected to the network via the communication unit 250.

The communication unit 250 sends/receives data such as coordinate position information, snapshot image, and response information to/from the other information sharing apparatus 400 connected to the network 300. In the case of receiving data, the received data is sent to the event processing unit 210 as an event.

FIG. 3 is a diagram illustrating an example of communications data format that the communication unit 250 exchanges. In FIG. 3, "To" includes destination address, "From" includes generating origin address, and "Via" includes transferring origin address. "Message-ID" such as IP address, URI (RFC2396), URL (RFC1738), and XMPP address (RFC6122) identifies messages. "References" refers to Message-ID. "Method" includes one of ADD, ACK, and NACK. ADD indicates addition of stroke (drawing), and ACK and NACK indicate responses to ADD. "Content-Type" indicates attributes of stroke data, and values such as application/inkml+xml or application/octet-stream are set to Content-Type. "Content-Length" indicates the size of Body in octet. If Content-Length is 0, that indicates that no data is included in Body. Body can be not only text data such as XML and JSON but also binary data.

FIG. 4 is a diagram illustrating the information sharing system 100 connected to the other information sharing apparatus 400 via the network 300 such as intranet and intranet. Usually, an information sharing system is constructed by connecting two or more information sharing apparatuses to such a network.

In FIG. 4, the information sharing apparatus 100 is a handwriting sender, and the information sharing apparatus 400 is a handwriting receiver. If a user handwrites something on the information sharing apparatus 100, the handwriting is displayed on the displaying unit 122 in the information sharing apparatus 100, and the handwriting is displayed on the displaying unit 112 in the information sharing apparatus 400. Since the information sharing apparatus 100 is connected to the information sharing apparatus 400 via the network 300, there is a time delay between displaying the handwriting at the information sharing apparatus 100 and at the information sharing apparatus 400. This time delay is not constant but varies depending on the state of the network. Therefore, the user of the information sharing apparatus 100 cannot know with certainty when the handwriting is displayed and whether or not the handwriting is displayed at the information sharing apparatus 400. In that case, interactive usage of handwriting is hampered at teleconference etc.

To solve this problem, in the present invention, if a user handwrites something on the information sharing apparatus as the sender, the handwriting is displayed in unsteady state such as gray colored or dotted lines etc. on the sender information sharing apparatus. Subsequently, after confirming that the handwriting is displayed on the information sharing apparatus as the receiver, the handwriting on the sender information sharing apparatus is changed to steady state.

First Embodiment

FIG. 5 is a diagram illustrating a configuration in a first embodiment. It should be noted that only the configuration related to the present invention is illustrated schematically in FIG. 5.

In FIG. 5, the information sharing system 100 is connected to the other information sharing apparatus 400 via the network 300 such as internet and intranet. As shown in FIG. 4, the information sharing apparatus 100 is the handwriting sender, and the information sharing apparatus 400 is the handwriting receiver. Regarding both the information sharing apparatus 100 and 400, the same symbols are assigned to the same components as in FIG. 2, and their descriptions are omitted.

The information sharing apparatus 400 as the handwriting receiver includes a response information generator 231. After generating strokes as a drawing image based on stroke data as coordinate information sent from the handwriting sender information sharing apparatus 100 by the drawing generator 216 and displaying the stroke on the displaying unit 112, the response information generator 231 generates response information (ACK) that indicates displaying succeeded and sends it to the handwriting sender information sharing apparatus 100 via the communication unit 250. As described later in detail, after receiving the response information from the handwriting receiver information sharing apparatus 400, the handwriting sender information sharing apparatus 100 changes the stroke displayed on the displaying unit 112 from unsteady state to steady state.

It should be noted that the information sharing apparatus 100 also includes the response information generator 231 since the information sharing apparatus 100 can also be the handwriting receiver.

FIG. 6 is a flowchart illustrating a process in the first embodiment. FIG. 6(*a*) is a flowchart illustrating the process in the handwriting sender information sharing apparatus 100, and FIG. 6(*b*) is a flowchart illustrating the process in the handwriting receiver information sharing apparatus 400. Hereinafter, the information sharing apparatus 100 is referred to as the handwriting sender, and the information sharing apparatus 400 is referred to as the handwriting receiver.

Firstly, the handwriting sender 100 initializes a communication failure counter and a display failure counter by setting to them 0 in S1001. The communication failure counter counts the number of times that the handwriting receiver 400 cannot receive stroke data, and it is used to resend the stroke data to the handwriting receiver 400 if the count value does not exceed a predefined value (referred to as "the upper limit for the number of times to try sending"). The display failure counter counts the number of times to exceed the upper limit for the number of times to try sending, and it is used to stop sending stroke data to the handwriting receiver 400 if the display failure counter value exceeds predefined value (referred to as "the upper limit for the number of times to try displaying". For example, a predefined area in the RAM 204 is used for the communication failure counter and display failure counter (software counter). Also, the values of the upper limit for the number of times to try sending and the upper limit for the number of times to try displaying are set in the RAM 204.

After initializing the communication failure counter and the display failure counter, the handwriting sender 100 waits for detecting coordinate information in S1002. After detecting the coordinate information, strokes as a drawing image is generated in S1003, and the strokes are displayed in unsteady state in S1004. It should be noted that the unsteady state can be displayed in a color whose transmittance is high (e.g., transmittance is 50%), a fluorescent color of the original color, a specified color such as gray, a half-width line of steady state, or a dotted line.

After displaying the stroke in unsteady state, the handwriting sender 100 checks whether or not the display failure counter value exceeds the upper limit for the number of times to try displaying in S1005. For example, the upper limit for the number of times to try displaying may be set to three. If the display failure counter value exceeds the upper limit for the number of times to try displaying, the handwriting sender 100 displays "displaying failed" on the displaying unit 112 in S1006. For example, this message is displayed in a lower corner of the screen. Subsequently, the handwriting sender 100 changes the stroke displayed on the displaying unit 112 from unsteady state to steady state in S1016, and the process returns to S1002. That is, if the message "displaying failed" is displayed, the user recognizes that the handwriting sender 100 does not send the stroke data to the handwriting receiver 400 since the handwriting receiver 400 does not receive the stroke data even if the handwriting sender 100 tried to send the data multiple times. In this case, of course, the stroke is not displayed at the handwriting receiver 400.

If the display failure counter value does not exceeds the upper limit for the number of times to try displaying (NO in S1005), the handwriting sender 100 sends the stroke data (coordinate information) to the handwriting receiver 400 in S1007. Subsequently, the handwriting sender 100 starts a timer in S1008 and check whether or not it receives response information of displaying succeeded (ACK) from the handwriting receiver 400 before the time-out in S1009 and S1010. For example, time-out can be set to three seconds. Of course, it is not limited to three seconds.

If ACK is received from the handwriting receiver 400 before the time-out (YES in S1009), the handwriting sender 100 resets the timer in S1011. Subsequently, the handwriting sender 100 changes the stroke displayed on the displaying unit 112 from unsteady state to steady state in S1016, and the process returns to S1002. Consequently, the user recognizes that the stroke is also displayed (drawn) at the handwriting receiver 400.

Alternatively, if the timer runs out before ACK is received from the handwriting receiver 400 (YES in S1010), the handwriting sender 100 increments the communication failure counter by one in S1012 and checks whether or not the communication failure counter value exceeds the upper limit for the number of times to try sending in S1013. For example, the upper limit for the number of times to try sending can be set to 10.

If the communication failure counter value does not exceed the upper limit for the number of times to try sending, the process returns to S1007, and the stroke data is resent to the handwriting receiver 400. Subsequently, if ACK is received from the handwriting receiver 400 before the communication failure counter value exceeds the upper limit for the number of times to try sending, the handwriting sender 100 changes the stroke displayed on the displaying unit 112 from unsteady state to steady state. Consequently, situation in which stroke data cannot be sent to the handwriting receiver 400 due to temporary failure in a network, etc., can be prevented.

Alternatively, if the communication failure counter value exceeds the upper limit for the number of times to try sending (YES in S1013), the handwriting sender 100 displays "displaying failed" in the lower corner etc. of the displaying unit 112 in S1014. Subsequently, the handwriting sender 100 increments the communication failure counter by one in S1015 and changes the stroke displayed on the displaying unit 112 from unsteady state to steady state in S1016, and the process returns to S1002. In this case, the user recognizes that the stroke data has not been sent to the handwriting receiver 400 yet due to some sort of failure in a network.

It should be noted that the handwriting sender 100 can keep the stroke display in unsteady state if it displays "displaying failed" or "communication failed" because of exceeding the upper limit for the number of times to try sending or the upper limit for the number of times to try displaying.

After receiving the stroke data (coordinate information) from the handwriting sender 100 in S1021, the handwriting receiver 400 generates stroke in S1022 and displays the stroke on the displaying unit 112 in steady state in S1023. Subsequently, the handwriting receiver 400 generates response information for displaying succeeded (ACK) in S1024 and sends it to the handwriting sender 400 in S1025.

Figure 7A:
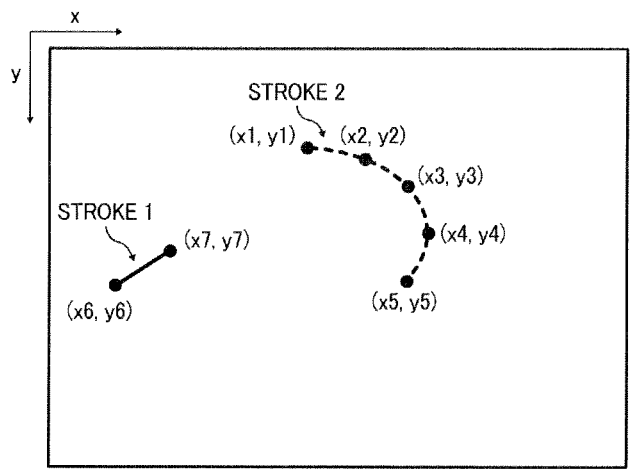
FIGS. 7A and 7B are diagrams illustrating an example of displaying stroke.
Figure 7B:
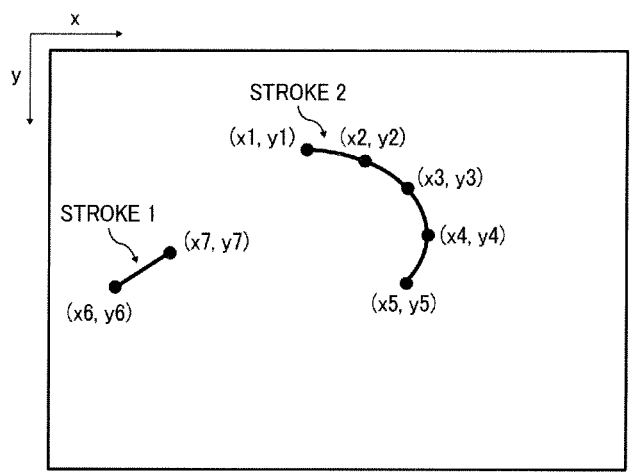

FIGS. 7A and 7B are diagrams illustrating an example of displaying stroke changing from unsteady state to steady state at the handwriting sender. It should be noted that solid lines indicate steady state and dotted lines indicate unsteady state in this description. FIG. 7A illustrates a case in which the user draws stroke 2 after confirming that display of stroke 1 changes into steady state. In this case, the stroke 2 is displayed in unsteady state (dotted line). After the stroke 2 is sent to the handwriting receiver and the handwriting receiver starts drawing, ACK is returned from the handwriting receiver. FIG. 7B illustrates this case. That is, the display of the stroke 2 changes from unsteady state (dotted line) to steady state (solid line). Consequently, the user can be sure that the handwriting receiver displays the stroke 2.

Second Embodiment

In this embodiment, the information sharing system is constructed connecting a server apparatus in addition to the information sharing apparatus to a network. The handwriting sender information sharing apparatus sends stroke data to the server apparatus. The server apparatus sends the stroke data sent from the handwriting sender to the handwriting receiver information sharing apparatus. After receiving response information from the handwriting receiver information sharing apparatus, the server apparatus sends the response information to the handwriting sender information sharing apparatus. After checking the response information from the server apparatus, the handwriting sender information sharing apparatus changes the stroke display from unsteady state to steady state. This embodiment is suitable if there are more than two handwriting receiver information sharing apparatuses.

Figure 8:
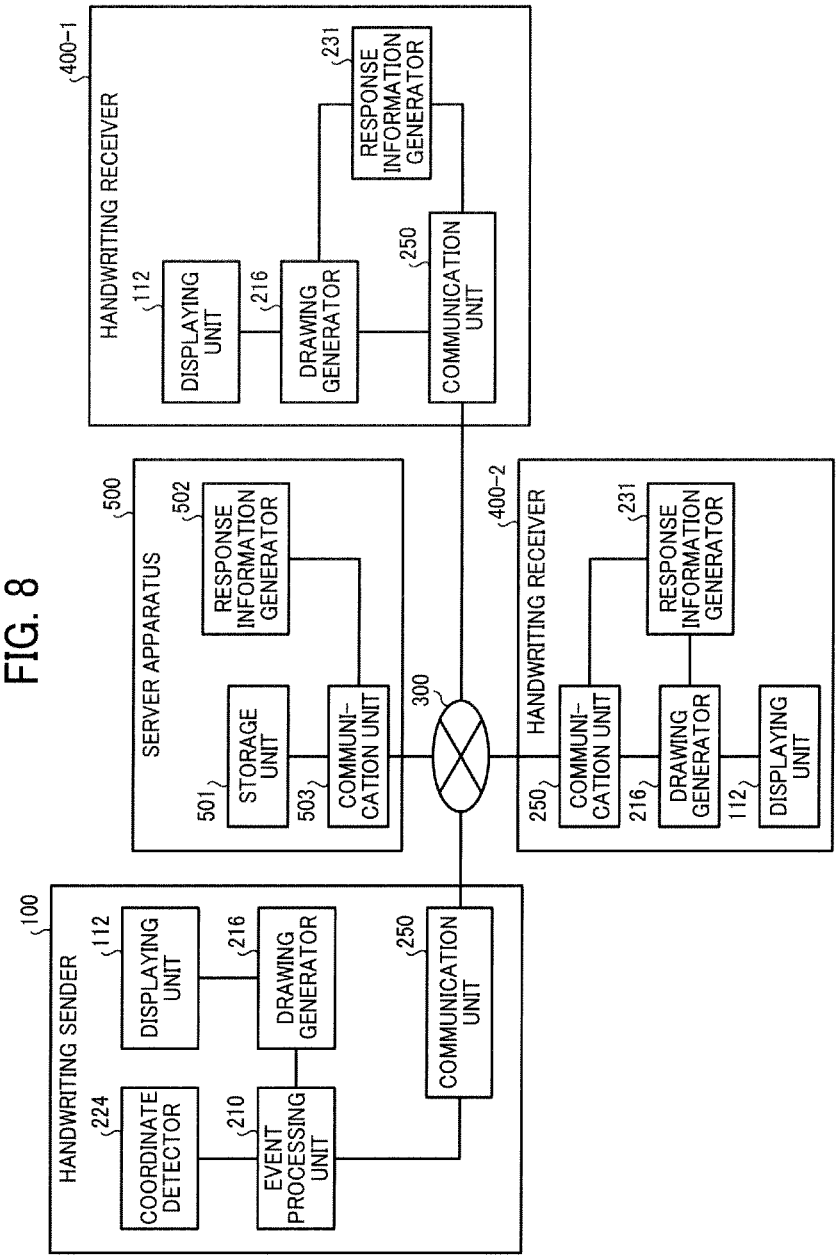
FIG. 8 is a diagram illustrating a system configuration as a second embodiment of the present invention.

FIG. 8 is a diagram illustrating a configuration in the second embodiment. It should be noted that only the configuration related to the present invention is illustrated in FIG. 8.

In FIG. 8, the information sharing apparatuses 100, 400-1, and 400-2, and the server apparatus 500 are connected with each other via the network 300 such as internet and intranet. The information sharing apparatus 100 is the handwriting sender, and the information sharing apparatuses 400-1 and 400-2 are the handwriting receivers.

It should be noted that two or more information sharing apparatuses as the handwriting receivers can be used even though only two information sharing apparatuses are shown in FIG. 8. Generally, this embodiment is effective for more information sharing apparatuses.

Configurations of the information sharing apparatus 100 as the handwriting sender and the information sharing apparatuses 400-1 and 400-2 as the handwriting receivers are the same as shown in FIG. 5. However, a communications partner of the communication unit 250 in the information sharing apparatus 100 as the handwriting sender and the communication unit 250 in the information sharing apparatuses 400-1 and 400-2 as the handwriting receivers is the server apparatus 500.

The server apparatus 500 includes a storage unit 501, a response information generator 502, and a communication unit 503. The storage unit 501 stores stroke data (coordinate information) received from the information sharing apparatus 100 as the handwriting sender. The response information generator 502 generates a first response information (referred to as ACK(1) hereinafter) after receiving the stroke data from the information sharing apparatus 100 as the handwriting sender, generates a second response information (referred to as ACK(2) hereinafter) after receiving response information (ACK) from the information sharing apparatuses 400-1 and 400-2 as the handwriting receivers, and generates negative response information (NACK) as a third response information if response information is not received from the information sharing apparatuses 400-1 and 400-2 as the handwriting receivers. The communication unit 503 exchanges data such as stroke data, ACK(1), ACK(2), and NACK with the information sharing apparatus 100 as the handwriting sender and data such as stroke data and ACK with the information sharing apparatuses 400-1 and 400-2 as the handwriting receivers.

Figure 9B:
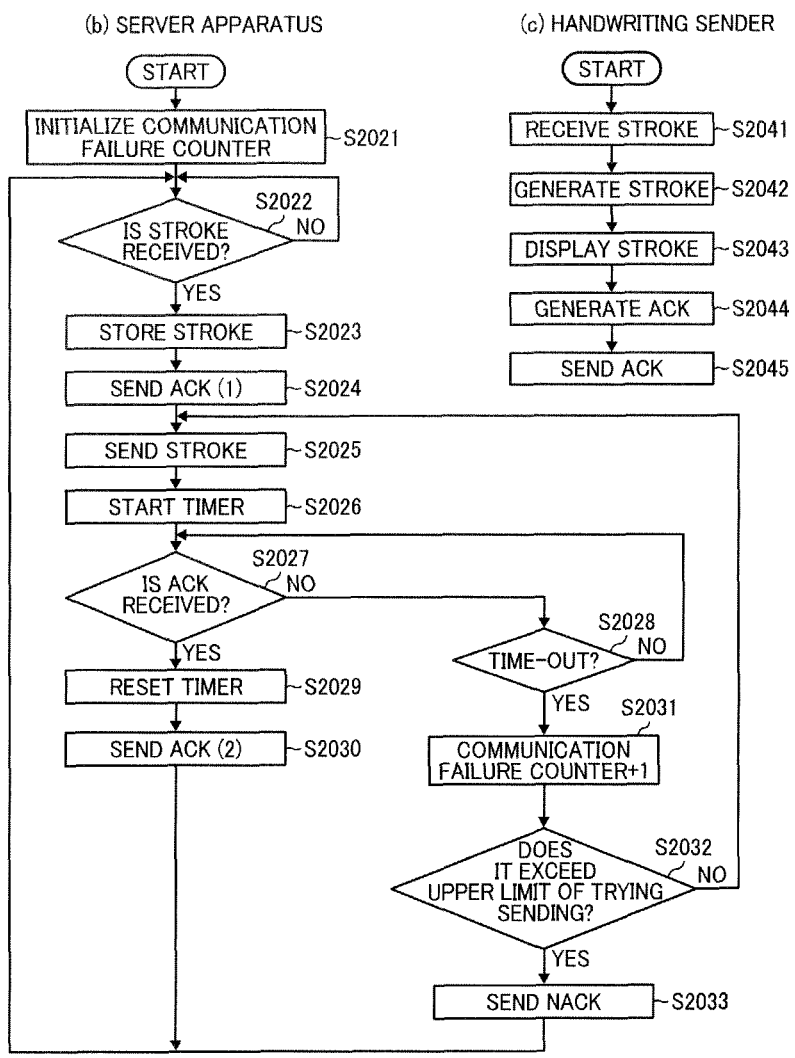

FIGS. 9A and 9B are flowcharts illustrating processing executed by the second embodiment. FIG. 9A is a flowchart illustrating a process in the information sharing apparatus 100 as the handwriting sender. FIG. 9B(b) is a flowchart illustrating a process in the server apparatus 500. FIG. 9B(c) is a flowchart illustrating a process in the information sharing apparatuses 400-1 and 400-2 as the handwriting receivers. Hereinafter, the information sharing apparatus 100 is referred to as the handwriting sender, and the information sharing apparatuses 400-1 and 400-2 are referred to as the handwriting receivers.

First, an operation in the handwriting sender 100 will be described below. The handwriting sender 100 initializes a communication failure counter to zeros in S2001. The communication failure counter counts the number of times that the server apparatus 500 does not receive stroke data and is used to resend the stroke data to the server apparatus 500 in case the count value does not exceed a predefined value (the upper limit for the number of times to try sending). It should be noted that a failure displaying counter is not used in this embodiment.

After initializing the communication failure counter, the handwriting sender 100 waits for detecting coordinate information in S2002. After detecting the coordinate information, the handwriting sender 100 generates stroke (drawing image) in S2003 and displays the stroke in unsteady state in S2004. Also, the handwriting sender 100 sends the stroke data (coordinate information) to the server apparatus 500 in S2005.

After sending the stroke data to the server apparatus 500, the handwriting sender 100 starts a timer in S2006 and checks whether or not ACK(1) is received as response information from the server apparatus 500 before the time-out in S2007 and S2008.

In case of receiving ACK(1) from the server apparatus 500 before the time-out (YES in S2007), the handwriting sender 100 resets the timer in S2009. Subsequently, the handwriting sender 100 waits for next response information from the server apparatus 500 in S2010 and S2011.

In case of receiving ACK(2) from the server apparatus 500 (YES in S2010), the handwriting sender 100 changes the stroke displayed on the displaying unit 112 from unsteady state to steady state in S2016, and the process returns to S2002. In this case, the user recognizes that the sever apparatus 500 received the stroke data, and the stroke is displayed (written) in the handwriting receivers 400-1 and 400-2.

In case of receiving NACK from the server apparatus 500 (YES in S2011), the handwriting sender 100 displays "displaying failed" in the lower corner, etc. of the displaying unit 112 in S2012. Subsequently, the handwriting sender 100 changes the stroke displayed on the displaying unit 112 from unsteady state to steady state in S2016, and the process returns to S2002. In this case, the user recognizes that the handwriting receivers 400-1 and 400-2 do not return ACK to the server apparatus 500 even though the server apparatus 500 sends the stroke data to the handwriting receivers 400-1 and 400-2 several times after the server apparatus 500 received the stroke data.

Alternatively, if the timer runs out before ACK(1) is received from the server apparatus 500 (YES in S2008), the handwriting sender 100 increments the communication failure counter by one in S2013 and checks whether or not the communication failure counter value exceeds the upper limit for the number of times to try sending in S2014.

If the communication failure counter value does not exceed the upper limit for the number of times to try sending (NO in S2014), the process returns to S2005, and the handwriting sender 100 resends the stroke data to the server apparatus 500.

After repeating the process from S2005 to S2008, S2013, and S2014, in case of exceeding the upper limit for the number of times to try sending (YES in S2014), the handwriting sender 100 displays "communication failed" in the lower corner of the displaying unit 112 in S2015 and changes the stroke displayed on the displaying unit 112 from unsteady state to steady state in S2016. Subsequently, the process returns to S2002. In this case, the user recognizes that the stroke data has not been sent to the server apparatus 500 in the first place (that means no stoke data is written in the handwriting receivers 400-1 and 400-2 obviously) due to some errors in the network etc.

Alternatively, after repeating the process from S2005 to S2008, S2013, and S2014, in case of receiving ACK(1) from the server apparatus 500 before exceeding the upper limit for the number of times to try sending (YES in S2007), the process proceeds to S2009. Since the subsequent operation is the same as the case that ACK(1) is returned from the server apparatus 500 after sending the first stroke data as described above, its description is omitted.

It should be noted that the handwriting sender 100 can keep the displayed stroke in unsteady state after displaying "displaying failed" or "communication failed" message also in this embodiment.

Next, an operation in the server apparatus 500 will be described below.

The server apparatus 500 initializes a communication failure counter to zero in S2021. The communication failure counter in the server apparatus 500 counts the number of times that the handwriting receivers 400-1 and 400-2 do not receive stroke data and is used to resend the stroke data to the handwriting receivers 400-1 and 400-2 in case the count value does not exceed a predefined value (the upper limit for the number of times to try sending).

After initializing the communication failure counter, the server apparatus 500 waits for receiving stroke data (coordinate information) from the handwriting sender 100 in S2022. After receiving the stroke data, the server apparatus 500 stores the stroke data in predefined memory in S2023 and returns ACK(1) as response information to the handwriting sender 100 in S2024. Subsequently, the server apparatus 500 sends the stroke data to the handwriting receivers 400-1 and 400-2 in S2025. This can be done by simultaneous transmissive communication for example.

After sending the stroke data to the handwriting receivers 400-1 and 400-2, the server apparatus 500 starts a timer in S2026 and checks whether or not response information for displaying succeeded (ACK) is received from the handwriting receivers 400-1 and 400-2 before the time-out in S2027 and S2028.

In case of receiving ACK from the handwriting receivers 400-1 and 400-2 before the time-out (YES in S2027), the server apparatus 500 resets the timer in S2029. Subsequently, the server apparatus sends ACK(2) to the handwriting sender 100 in S2030, and the process returns to S2022.

Alternatively, if the timer runs out before ACK is received from the handwriting receivers 400-1 and 400-2 (YES in S2028), the server apparatus 500 increments the communication failure counter by one in S2031 and checks whether or not the communication failure counter value exceeds the upper limit for the number of times to try sending in S2032.

If the communication failure counter value does not exceed the upper limit for the number of times to try sending (NO in S2032), the process returns to S2025, and the server apparatus 500 resends the stroke data to the handwriting receivers 400-1 and 400-2. In this case, if the server apparatus 500 has received ACK from either the handwriting receiver 400-1 or 400-2, the server apparatus 500 resends the stroke data to the handwriting receiver from which ACK is not received. If there are multiple handwriting receivers and ACK is not received from more than two handwriting receivers, the stroke data can be resend to all of the handwriting receivers in simultaneous transmissive communication.

After repeating the process from S2025 to S2028, S2031, and S2032, in case of receiving ACK from the handwriting receivers 400-1 and 400-2 before exceeding the upper limit for the number of times to try sending (YES in S2027), the server apparatus 500 resets the timer in S2029 and returns ACK(2) to the handwriting sender 100 in S2030. Subsequently, the process returns to S2022. Consequently, it is possible to cope with temporary failures in the network between the server apparatus 500 and the handwriting receivers 400-1 and 400-2 etc.

Alternatively, after repeating the process from S2025 to S2028, S2031, and S2032, in case of exceeding the upper limit for the number of times to try sending (YES in S2031), the server apparatus 500 returns NACK to the handwriting sender 100 in S2033, and the process returns to S2022.

Although the server apparatus 500 returns ACK(2) to the handwriting sender in case of receiving ACK from all of the handwriting receivers in the above description, the server apparatus can return ACK(2) to the handwriting sender in case of receiving ACK from fewer than all of the handwriting receivers, e.g., over half of the handwriting receivers. That is, not all the handwriting receivers always return ACK to the server apparatus 500 if there are information sharing apparatuses at multiple sites. In this case, user-friendliness can be improved assuming it is OK to draw strokes in at least the majority of handwriting receivers.

Next, an operation in the handwriting receivers 400-1 and 400-2 will be described below.

Basically, the operation in the handwriting receivers 400-1 and 400-2 is the same as the case in the first embodiment described above except that the communications partner is the server apparatus 500. That is, after receiving stroke data (coordinate information) from the server apparatus 500 in S2041, the handwriting receivers 400-1 and 400-2 generate stroke (drawing image) in S2042 and displays the stroke on the displaying unit 112 in steady state in S2043. Subsequently, the handwriting receivers 400-1 and 400-2 generate response information for displaying succeeded (ACK) in S2044 and send it to the server apparatus 500 in S2045.

Third Embodiment

The overall configuration of this embodiment is the same as the second embodiment. In this embodiment, as in the second embodiment, the information sharing apparatus as the handwriting sender sends stroke data to the server apparatus, and the server apparatus stores the stroke data sent from the information sharing apparatus as the handwriting sender and sends the stroke data to the information sharing apparatus as the handwriting receiver. However, in this embodiment, the server apparatus returns ACK as response information to the information sharing apparatus as the handwriting sender after receiving stroke data from the information sharing apparatus as the handwriting sender without waiting for ACK for displaying succeeded sent from the information sharing apparatus as the handwriting receiver. After receiving ACK from the server apparatus, the information sharing apparatus as the handwriting sender changes the display of the stroke from unsteady state to steady state. This embodiment is effective in case quick operation is desired.

Figure 10B:
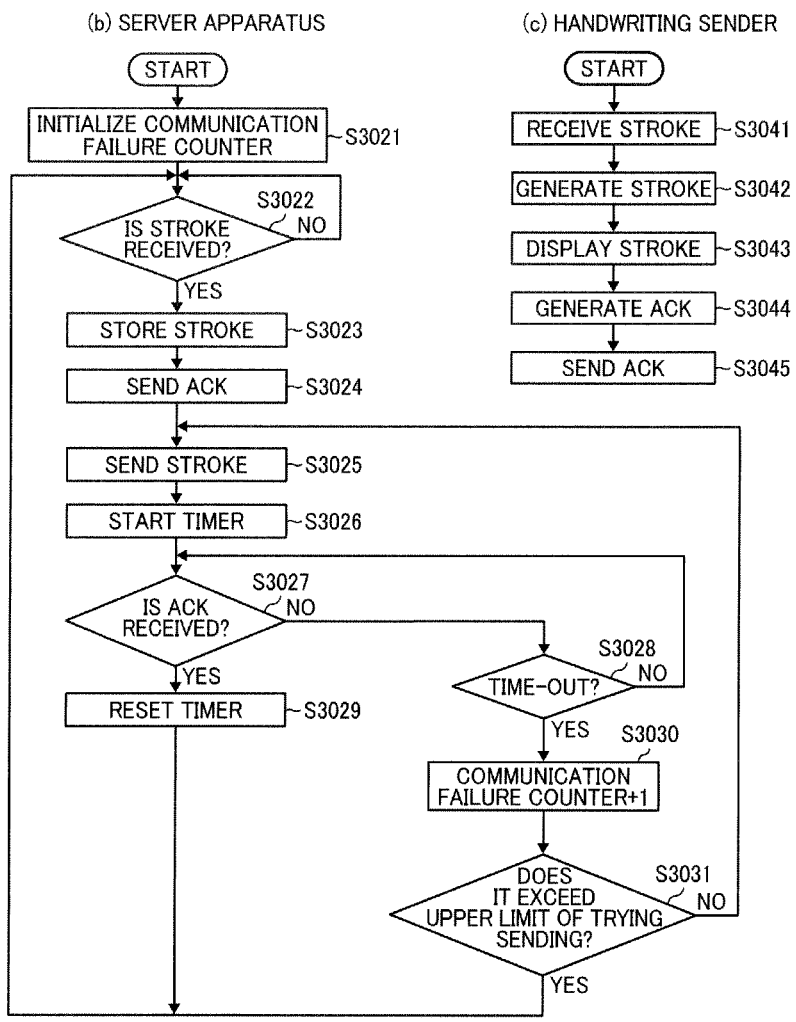

FIGS. 10A and 10B are flowcharts illustrating a process in the third embodiment. It should be noted that the overall system configuration is the same as shown in FIG. 8. FIG. 10A is a flowchart illustrating a process in the information sharing apparatus 100 as the handwriting sender. FIG. 10B(b) is a flowchart illustrating a process in the server apparatus 500. FIG. 10B(c) is a flowchart illustrating a process in the information sharing apparatuses 400-1 and 400-2 as the handwriting receivers. Hereinafter, the information sharing apparatus 100 is referred to as the handwriting sender, and the information sharing apparatuses 400-1 and 400-2 are referred to as the handwriting receivers.

First, an operation in the handwriting sender 100 will be described below. The handwriting sender 100 initializes a communication failure counter to zeros in S3001. The communication failure counter counts the number of times that the server apparatus 500 does not receive stroke data and is used to resend the stroke data to the server apparatus 500 in case the count value does not exceed a predefined value (the upper limit for the number of times to try sending).

After initializing the communication failure counter, the handwriting sender 100 waits for detecting coordinate information in S3002. After detecting the coordinate information, the handwriting sender 100 generates stroke (drawing image) in S3003 and displays the stroke in unsteady state in S3004. Also, the handwriting sender 100 sends the stroke data (coordinate information) to the server apparatus 500 in S3005.

After sending the stroke data to the server apparatus 500, the handwriting sender 100 starts a timer in S3006 and checks whether or not ACK is received as response information from the server apparatus 500 before the time-out in S3007 and S3008.

In case of receiving ACK from the server apparatus 500 before the time-out (YES in S3007), the handwriting sender 100 resets the timer in S3009. Subsequently, the handwriting sender 100 changes the stroke display from unsteady state to steady state in S3013, and the process returns to S3002.

Alternatively, if the timer runs out before ACK is received from the server apparatus 500 (YES in S3008), the handwriting sender 100 increments the communication failure counter by one in S3010 and checks whether or not the communication failure counter value exceeds the upper limit for the number of times to try sending in S3011.

If the communication failure counter value does not exceed the upper limit for the number of times to try sending (NO in S3011), the process returns to S3005, and the stroke data is resent to the server apparatus 500.

After repeating the process from S3005 to S3008, S3010, and S3011, in case of exceeding the upper limit for the number of times to try sending (YES in S3011), the handwriting sender 100 displays "communication failed" in the lower corner etc. of the displaying unit 112 in S3012 and changes the stroke displayed on the displaying unit 112 from unsteady state to steady state in S3013. Subsequently, the process returns to S3002.

Alternatively, after repeating the process from S3005 to S3008, S3010, and S3011, in case of receiving ACK from the server apparatus 500 before exceeding the upper limit for the number of times to try sending (YES in S3007), the process proceeds to S3009. In this case, after resetting the timer, the handwriting sender 100 changes the stroke display from unsteady state to steady state, and the process returns to S3002 as described above.

It should be noted that the handwriting sender 100 can keep the displayed stroke in unsteady state after displaying "communication failed" in this embodiment too.

Next, an operation in the server apparatus 500 will be described below. The server apparatus 500 initializes a communication failure counter to zeros in S3021. The communication failure counter in the server apparatus 500 counts the number of times that the handwriting receivers 400-1 and 400-2 do not receive stroke data and is used to resend the stroke data to the handwriting receivers 400-1 and 400-2 in case the count value does not exceed a predefined value (the upper limit for the number of times to try sending).

After initializing the communication failure counter, the server apparatus 500 waits for receiving stroke data (coordinate information) from the handwriting sender 100 in S3022. After receiving the stroke data, the server apparatus 500 stores the stroke data in predefined memory in S3023 and returns ACK as response information to the handwriting sender 100 in S3024. Subsequently, the server apparatus 500 sends the stroke data to the handwriting receivers 400-1 and 400-2 in S2025. This can be done by simultaneous transmissive communication for example.

After sending the stroke data to the handwriting receivers 400-1 and 400-2, the server apparatus 500 starts a timer in S3026 and checks whether or not response information for displaying succeeded (ACK) is received from the handwriting receivers 400-1 and 400-2 before the time-out in S3027 and S3028.

In case of receiving ACK from the handwriting receivers 400-1 and 400-2 before the time-out (YES in S3027), the server apparatus 500 resets the timer in S3029, and the process returns to S3022. That is, the server apparatus 500 does not send ACK(2) to the handwriting sender 100.

Alternatively, if the timer runs out before ACK is received from the handwriting receivers 400-1 and 400-2 (YES in S3028), the server apparatus 500 increments the communication failure counter by one in S3030 and checks whether or not the communication failure counter value exceeds the upper limit for the number of times to try sending in S3031.

If the communication failure counter value does not exceed the upper limit for the number of times to try sending (NO in S3031), the process returns to S3025, and the server apparatus 500 resends the stroke data to the handwriting receivers 400-1 and 400-2. In this case, if the server apparatus 500 has received ACK from either the handwriting receiver 400-1 or 400-2, the server apparatus 500 can resend the stroke data either to both of the handwriting receivers or only to the handwriting receiver from which ACK is not received.

After repeating the process from S3025 to S3028, S3030, and S3031, in case of receiving ACK from the handwriting receivers 400-1 and 400-2 before exceeding the upper limit for the number of times to try sending (YES in S3027), the server apparatus 500 resets the timer in S2029, and the process returns to S3022.

Alternatively, after repeating the process from S3025 to S3028, S3030, and S3031, in case of exceeding the upper limit for the number of times to try sending (YES in S3031), the process returns to S3022. That is, the server apparatus 500 does not return NACK to the handwriting sender 100.

Since the operation in the handwriting receivers 400-1 and 400-2 are the same as in the second embodiment, those descriptions are omitted.

Although the handwriting sender cannot check whether or not the handwriting receiver actually displayed the stroke in this embodiment, the quickness of operations can be improved. It should be noted that it is possible to improve the success rate of displaying strokes at the handwriting receiver side by resending stroke data to the handwriting receiver by the server apparatus if the handwriting receiver does not receive the stroke data.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An information sharing apparatus, comprising:
   a coordinate detector to detect coordinate information corresponding to current position of a drawing device;
   a processor to generate a drawing image in accordance with, and reflecting, the coordinate information detected by the coordinate detector, and to display the drawing image on a display in unsteady state; and
   a communication unit to send the coordinate information to an other information sharing apparatus and receive response information from the other information sharing apparatus indicating successful display of a counterpart image based on the coordinate information reflected in the drawing image generated by the processor,
   wherein the processor changes a displaying state of the drawing image from (a) unsteady state in which the coordinate information reflected in the drawing image has been sent to the other information sharing apparatus to (b) steady state in accordance with the response information received from the other information sharing apparatus.

2. An information sharing system comprising a plurality of information sharing apparatuses, wherein at least a first information sharing apparatus and a second information sharing apparatus of the plurality of information processing apparatuses comprises:
   a coordinate detector to detect coordinate information corresponding to current position of a drawing device;
   a processor to generate a drawing image in accordance with, and reflecting, the coordinate information detected by the coordinate detector or the coordinate information received from another information sharing apparatus, to display the drawing image on a display, and to generate response information in response to generating/displaying drawing image generated from the coordinate information received from the other information sharing apparatus; and
   a communication unit to send the coordinate information to another information sharing apparatus and receive response information from the other information sharing apparatus indicating success in displaying a counterpart image based on the coordinate information reflected in the drawing image generated by the processor,
   wherein a first information sharing apparatus whose coordinate detector detected the coordinate information displays the drawing image on the display based on the coordinate information in unsteady state and in said unsteady state sends the coordinate information to a second information sharing apparatus, and the second information sharing apparatus generates the counterpart image reflecting the coordinate information sent from the first information sharing apparatus, displays the counterpart image, and sends response information indicating success in displaying the counterpart image to the first information sharing apparatus, and the first information sharing apparatus changes the display from (a) unsteady state in which the coordinate information reflected in the drawing image has been sent to the second information sharing apparatus to (b) steady state after receiving the response information from the second information sharing apparatus.

3. The information sharing system according to claim 2, wherein the first information sharing apparatus resends the coordinate information unless it receives the response information within a predefined time period.

4. The information sharing system according to claim 3, wherein the first information sharing apparatus counts the number of times to resend the coordinate information to the second information sharing apparatus, displays a message indicating communication failed on the display if the counter value exceeds a predefined upper limit for the number of times to try sending, counts the number of communication failures, and displays a message indicating displaying failed on the display if the counter value exceeds the predefined upper limit for the number of times to try displaying.

5. An information sharing system comprising a plurality of information sharing apparatuses and a server apparatus connected with each other via a network, wherein the information sharing system comprises:
   a coordinate detector to detect coordinate information corresponding to current position of a drawing device;
   a processor to generate a drawing image in accordance with, and reflecting, the coordinate information, to display the drawing image on a display, and to generate response information in response to generating/displaying drawing image generated from the coordinate information;
   a communication unit to exchange the coordinate information and the response information with the plurality of information sharing apparatuses; and
   a memory to store the coordinate information received from the information sharing apparatus,
   wherein a first information sharing apparatus whose coordinate detector detected the coordinate information displays the drawing image on the display based on the coordinate information in unsteady state, and in said unsteady state sends the coordinate information to a second information sharing apparatus and stores the coordinate information sent from the first information sharing apparatus, and the second information sharing apparatus generates a counterpart image reflecting the coordinate information sent from the first information sharing apparatus, displays the counterpart image, and sends response information indicating success in displaying the counterpart image based on the coordinate information reflected in the drawing image generated by the processor to the first information sharing apparatus, and the first information sharing apparatus changes the display from (a) unsteady state in which the coordinate information reflected in the drawing image has been sent to the second information sharing apparatus to (b) steady state after receiving the response information from the second information sharing apparatus.

6. The information sharing system according to claim 5, wherein the first information sharing apparatus resends the coordinate information to the server apparatus unless the first information sharing apparatus receives the response information from the server apparatus within predefined period, and the server apparatus resends the coordinate information to the second information sharing apparatus unless the server apparatus receives the response information from the second information sharing apparatus.

7. The information sharing system according to claim 5, wherein the server apparatus sends first response information to the first information sharing apparatus after receiving the coordinate information from the first information sharing apparatus, sends second response information to the first information sharing apparatus after receiving the response information from the second information sharing apparatus, and sends third response information to the first information sharing apparatus unless the server apparatus receives response information from the second information sharing apparatus, and the first information sharing apparatus displays a message indicating that communication failed unless the first information sharing apparatus receives the first response information from the server apparatus, changes the display from unsteady state to steady state if the first information sharing apparatus receives the second response information from the server apparatus after receiving the first response information from the server apparatus, and displays a message indicating that displaying failed if the first information sharing apparatus receives the third response information after receiving the first response information from the server apparatus.

* * * * *